(No Model.)  2 Sheets—Sheet 1.
W. R. FOWLER.
MACHINE FOR CUTTING CLOTH.
No. 245,150. Patented Aug. 2, 1881.
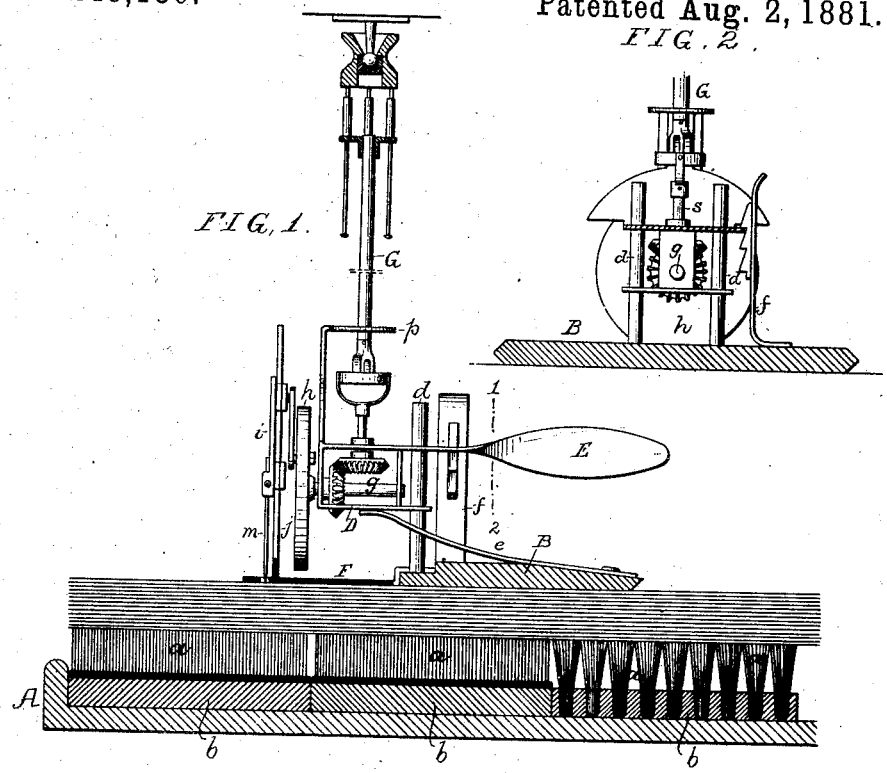
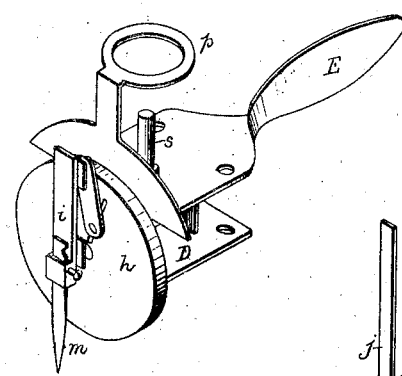
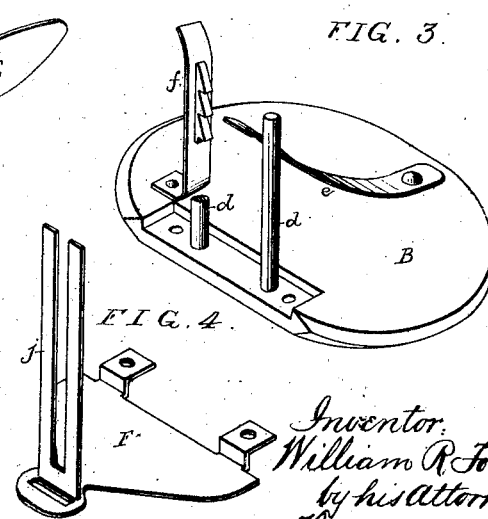
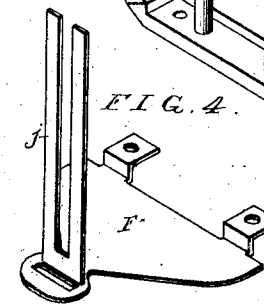
Witnesses
Hubert Howson
Harry Smith
Inventor
William R. Fowler
by his Attorneys
Howson and Son (No Model.) 2 Sheets—Sheet 2.

W. R. FOWLER.
MACHINE FOR CUTTING CLOTH.

No. 245,150. Patented Aug. 2, 1881.

Witnesses:
Hubert Howson
Harry Smith

Inventor:
William R. Fowler
by his Attorneys
Howson and Son

UNITED STATES PATENT OFFICE.

WILLIAM R. FOWLER, OF PHILADELPHIA, PENNSYLVANIA, ASSIGNOR TO MARTIN J. MYERS, OF SAME PLACE.

MACHINE FOR CUTTING CLOTH.

SPECIFICATION forming part of Letters Patent No. 245,150, dated August 2, 1881.

Application filed November 15, 1880. (No model.)

*To all whom it may concern:*

Be it known that I, WILLIAM R. FOWLER, a citizen of the United States, residing in Philadelphia, Pennsylvania, have invented certain Improvements in Machines for Cutting Cloth, &c., of which the following is a specification.

The main object of my invention is to so construct a machine for cutting cloth and like material that the knife-carrying devices will be entirely above the material, so that the latter is not raised from the bed while it is being cut, further objects being to permit the commencement of the cut at any desired point on the material, to allow cutting in either direction, to stop the cutting operation without stopping the movement of the knife, and to permit the free movement of the knife and knife-carrying devices over the material in any direction when the knife is free from the cut.

Figure 6:
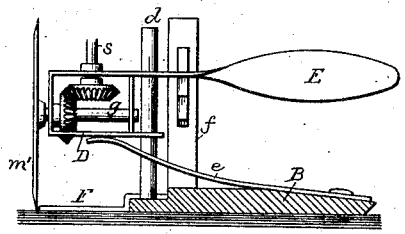
Figure 7:
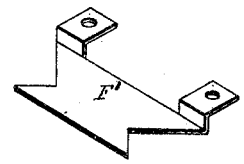
Figure 15:
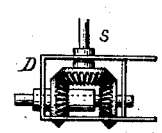

In the accompanying drawings, Figure 1 is a view, partly in section and partly in elevation, showing my improvements in cloth-cutting machines; Fig. 2, a transverse section on the line 1 2; Figs. 3, 4, and 5, perspective views of parts of the knife-carrying device detached from each other; Fig. 6, a view of the knife-carrier arranged for use in connection with a rotary cutting-knife; Fig. 7, a perspective view of part of the device shown in Fig. 6; Figs. 8 to 14, inclusive, views of various forms of reciprocating knives used in connection with the machine; Fig. 15, a view showing a modified arrangement of gearing for use with two rotating knives, and Fig. 16 a view of the device arranged for cutting strips.

In Fig. 1, A represents part of a table carrying the cloth-supporting bed, which forms one of the main features of my invention. This supporting-bed consists, preferably, of hair, bristles, pampas grass, or other comparatively stiff fibers, $a$, set on end and secured to a suitable backing, $b$.

The bed, for convenience of transportation and to facilitate application to and removal from the table A, is made in sections, as shown in Fig. 1, and the fibers are secured to the backing $b$ in any suitable manner. They may, for instance, be embedded in cement, as shown at the left-hand side of said figure; or they may be arranged in knots and drawn through openings in the backing, as in making brushes and as shown at the right-hand side of Fig. 1. In fact, the particular method of securing the fibers to the backing may be varied to any desired extent, so long as the upturned ends of the fibers present a level and uniform bed on which the cloth may be laid.

I have discovered that a pile of cloth deposited on a cutting-bed of this character is, so far as regards downward pressure, supported as well as upon a rigid table of wood, while there is not that tendency of the cloth to be moved laterally which exists when said cloth rests upon a smooth wooden table.

The main advantage of my improved cloth-supporting bed, however, is that the point or lower portion of the cutting-knife can penetrate and be moved forward and backward through the same without impediment, so that the cutting operation can be performed without lifting the cloth from the bed, as usual, and without impairing the proper and firm bearing of the cloth upon the supporting-bed at all times, the fibers, on the penetration of the knife into or movement of the same through the bed, yielding laterally to permit such entrance or movement, so that they will not be cut or otherwise injuriously affected.

A plate, B, rests upon the cloth, and this plate has two vertical standards, $d\ d$, which serve as guides for a frame, D, projecting from or forming part of which is a handle, E. The frame D is capable of sliding vertically on the standards $d$, a spring, $e$, on the plate B tending to elevate the frame, which, however, may be depressed and retained in the position to which it is adjusted, a spring-catch, $f$, having a series of retaining-notches, effecting the latter result by engagement with a projecting lug on the frame.

To suitable bearings in the frame D is adapted a shaft, $g$, the projecting end of which is furnished with a wheel, $h$, a crank-pin on the latter being connected, by means of a rod, to a slide, $i$, adapted to and guided by a slotted vertical standard, $j$, projecting from a tongue, F, secured to the plate B. The slide $i$ carries the cutting-knife $m$, which is constructed as described hereinafter, and the crank-pin on the wheel h is preferably made adjustable, so that the stroke of the knife may be properly proportioned in respect to the thickness of the layers of cloth to be cut, the frame D being so adjusted that the point of the knife when at the limit of its downward movement will project below the cloth and into the supporting-bed, while, when the knife is at the limit of its upward movement, the point of the knife will not be raised above the top of the cloth, or rather will not leave the cut.

When it is desired to stop the cutting operation prior to moving the cutting-knife to a new position on the cloth the frame D is released from the control of the spring-catch f and permitted to ascend so as to elevate the knife and its reciprocating devices to such an extent that the point of the knife in its downward stroke will not touch the surface of the cloth. By this means the knife can be moved about over the cloth to any desired position without the necessity of stopping the operation of said knife, the latter, owing to its pointed lower end, commencing to cut in the new position immediately upon depressing the frame D, which is gradually forced downward until the point of the knife on its downward stroke passes entirely through the layers of cloth and penetrates the bed, when the frame is locked in position by the spring-catch, and the movement of the knife in accordance with the lines of the pattern is continued.

It will thus be seen that the knife is at liberty to commence its cut at any desired point on the cloth, the commencement of the cut at the edge of the cloth, as in other machines, not being essential.

The tongue F at and near the knife slot is contracted in width, in order that the lines of the pattern marked on the cloth will not be obscured to such an extent as to interfere with the proper guidance of the knife, or, if desired, the tongue F may be made partly of glass, so that the lines of the pattern may be seen through the same.

Instead of carrying a wheel, h, with a crank-pin for actuating a reciprocating knife, the shaft g may be furnished with a rotary knife, m', as shown in Fig. 6. In this case the tongue F, with its vertical standard j, is detached from the plate B, and a tongue, F', of a different shape—such, for instance, as shown in Fig. 7—is substituted therefor. The same advantages attend the use of the vertically-adjustable frame D, in connection with the rotary knife, as I have before described in connection with the reciprocating knife.

Various means may be employed for rotating the shaft g. For instance, a pulley on said shaft may receive a belt from a driving-pulley located above the table, said belt being capable of expansion and contraction without interfering with its driving properties, or the shaft g may be secured to or form part of a flexible shaft driven from any adjacent source of power; but the means which I prefer to adopt for driving the shaft g are shown in Fig. 1, on reference to which it will be observed that the said shaft carries a bevel-wheel gearing into a pinion on a vertical shaft, s, adapted to bearings in the frame D, the upper end of this shaft being clutched or otherwise secured to the lower end of a power-transmitting shaft, G, which is similar to that described in my application for patent filed May 24, 1880, the shaft being capable of expansion and contraction, and being furnished with universal joints, which permit the maintenance of the knife and knife-carrying plate in proper position without interference with the driving of the same. In order, however, to prevent the shaft G from assuming such an angle as would interfere with the proper action of the parts, I provide the frame D with a guard-ring, p, which restricts the inclination of the shaft G to the proper limits.

Figures 8, 9, 10, 11, 12, 13, 14:
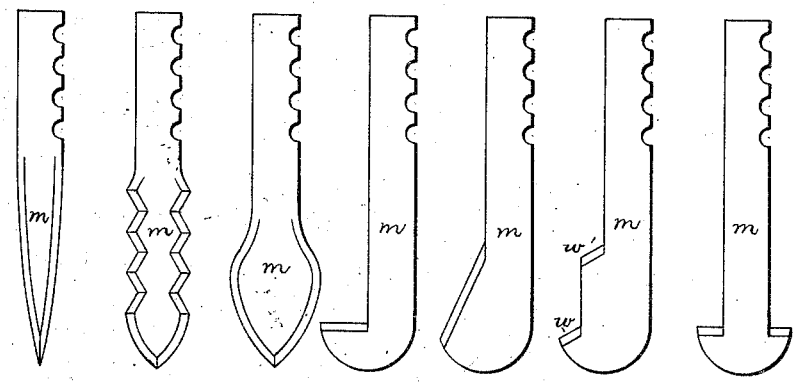

Various forms of reciprocating knives may be used with my improved cutting-machine. In Figs. 8, 9, and 10 I have shown three forms which have been found to be effective in practice.

The knife Fig. 8 is a straight blade, tapered toward the point and sharpened on both edges. The knife Fig. 9 has opposite notched and sharpened edges, and the knife Fig. 10 is tapered gradually from its widest portion toward both point and shank, all of these knives being adapted to cut both on the upward and downward movement.

By sharpening the knives on both edges the cutting of the cloth can be effected either on the forward or backward movement of the knife, thus rendering the cutting of patterns of certain characters more practicable than when the knife can cut only on the forward movement.

The knives shown in Figs. 8, 9, and 10 cut continuously and on the same principle as a rotary knife—that is to say, by a pressure of the cutting-face against the cloth in advance of the same.

When it is desired to effect the cutting by a positive action—that is, by confining the cloth between the cutting-face of the knife and an abutment or support against which the cloth is pressed by the knife during the cutting operation—I make the knife hooked, as shown in Figs. 11 and 12, for instance. The cloth in this case is cut on the upward movement of the knife only, the plate B forming the point of resistance for the cloth, and the lower end of the knife, on the downward movement of the latter, being projected so far beneath the cloth that the hooked portion of the said knife is at liberty to be moved forward to make a fresh cut. On the upward movement the cutting-face of the knife passes above the cloth and enters a slot in the plate B. Where the layers of cloth are numerous a double-hooked knife, such as shown in Fig. 13, may be used, one face, w, of such a knife cutting from the bottom of the pile to or about the center of the same, and the other face, w', cutting from the center to the top, the extent of reciprocation of the knife being thus reduced. The cutter may also be made to cut in both directions, as shown in Fig. 14. A hooked cutter of the character shown in Figs. 11 to 14 is blunt on the lower end, and hence it may not be necessary, in some cases where such cutters are used, to employ a supporting-bed consisting of fibers set on end. The material or support used, however, must be of such a yielding or elastic character that it can be depressed without injury by the lower end of the knife when the latter is projected and moved forward beneath the cloth.

I do not desire to claim specifically in this application hooked knives cutting on the upward stroke, as above described, as this will form the subject of a separate application for a patent.

In place of a reciprocating knife or single rotary knife, two rotary knives turning in opposite directions and working in a single cut may sometimes be used, the gearing in such case being similar to that shown in Fig. 15, on reference to which it will be observed that the pinion on the shaft *s* gears into two bevel-wheels, one on a sleeve adapted to carry one rotary knife, and the other on a spindle passing through said sleeve and adapted to carry the other knife.

Figure 16:
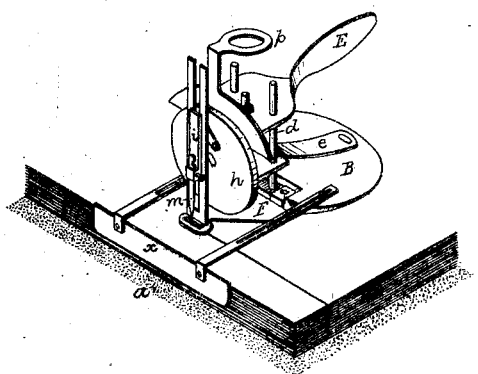

When it is desired to cut a number of strips in succession a plate, *x*, adapted to bear against the edge of the layers of cloth and having arms connected to the plate B, may be used as shown in Fig. 16, the plate being adjusted from and toward the knife in accordance with the width of the strip to be cut, so that said plate acts both as a gage and guide.

Although I prefer the plate B resting on the cloth as the means of supporting and carrying the knife and knife-operating devices, said knife and operating devices may be carried by a frame supported above the cloth on suitable guides or ways, if desired.

A cut pile fabric having a pile sufficiently long and stiff may in some cases be used as a supporting-bed, or fine wires may sometimes be used in place of animal or vegetable fibers, the latter, however, being preferred on account of their economy and because the cutting-edge of the knife is not materially affected by contact therewith.

Although I have shown and described my invention as applied to the cutting of cloth, it will be evident that the machine can be used for cutting paper, leather, or fibrous and textile material generally.

I claim as my invention—

1. The combination of a cutting-knife, power-driven mechanism for operating the same, a knife-carrier wholly above the surface of the material to be cut, and free to move over said surface in accordance with a pattern marked thereon, and a supporting-bed for said material adapted to permit the traversing of the knife in following the pattern, and the projection of the point or lower portion of said knife beneath the material, all substantially as set forth.

2. The within-described supporting-bed for the cloth or other material to be cut, said bed consisting of fibers arranged on end, as specified.

3. A cloth-supporting bed consisting of sections, each composed of fibers arranged on end and secured to a backing, as set forth.

4. The combination of a bed adapted to support the material being cut, and to permit the traversing of the knife and the projection of the same beneath said material, with a knife-carrying plate adapted to rest on the cloth and capable of being moved over the same in accordance with the lines of a pattern marked thereon, and with devices for actuating the knife, all substantially as specified.

5. The combination of a supporting-bed, substantially as described, a movable knife-carrier supported on or above the surface of the cloth, and a flexible power-transmitting shaft for actuating said knife, as specified.

6. The combination of a flexible power-transmitting shaft, G, with a movable knife-carrier, having a guard-ring, *p*, for limiting the inclination of said shaft, as specified.

7. The combination of the mechanism for traversing the knife over the material to be cut with the knife and knife-operating devices adjustable vertically in respect to said traversing mechanism, as described, whereby the knife may be withdrawn from the cloth without stopping the movement of said knife.

8. The combination of the mechanism for traversing the knife over the material to be cut with the knife and knife-operating devices vertically adjustable in respect to said traversing mechanism, and with a retainer for holding the same in the depressed position, as set forth.

9. The combination of the mechanism for traversing the knife over the material to be cut with the knife and knife-operating devices vertically adjustable in respect to said traversing mechanism, and with a spring for elevating the same, as described.

10. The combination of the knife and knife-operating devices with the knife-carrying plate B, adapted to rest on the material to be cut, and having a tongue, F, contracted at and near the knife-slot, as specified.

11. The combination of the knife and knife-operating devices with the knife-carrying plate B, adapted to rest on the material to be cut, and having a tongue, F, detachably secured thereto, as set forth.

12. The combination of a supporting-bed, substantially as described, a knife-carrier supported on or above the material to be cut, a knife sharpened on both edges so as to cut either forward or backward, and devices for reciprocating said knife, as specified.

13. The combination of the supporting-bed, substantially as described, with a knife-carrier supported on or above the material to be cut, and a reciprocating knife having a pointed lower end, whereby it is adapted to enter the material at any point, as described.

14. The combination of the knife-carrier with a plate, $x$, secured to said carrier, and adapted to bear on the edge of the material which is being cut, whereby it serves as a gage and guide for the cutting of strips, as set forth.

In testimony whereof I have signed my name to this specification in the presence of two subscribing witnesses.

WM. R. FOWLER.

Witnesses:
JAMES F. TOBIN,
HARRY SMITH.